United States Patent [19]

Walton

[11] Patent Number: 4,656,472

[45] Date of Patent: Apr. 7, 1987

[54] PROXIMITY IDENTIFICATION SYSTEM WITH POWER AIDED IDENTIFIER

[76] Inventor: Charles A. Walton, 19115 Overlook Rd., Los Gatos, Calif. 95030

[21] Appl. No.: 693,992

[22] Filed: Jan. 23, 1985

[51] Int. Cl.⁴ .......................... G07D 7/00; H04Q 7/00
[52] U.S. Cl. .......................... 340/825.34; 340/825.54; 340/825.72; 342/44
[58] Field of Search .................. 340/825.06, 825.10, 340/825.34, 825.69, 825.72, 825.54, 825.70, 539, 572, 573, 825.3, 825.64; 343/6.5 R–6.8 LC; 455/41, 70, 71; 361/172; 235/439–444; 380; 368/205

[56] References Cited

U.S. PATENT DOCUMENTS

| | | | |
|---|---|---|---|
| 2,927,321 | 3/1960 | Harris | 343/6.5 R |
| 3,299,424 | 6/1967 | Vinding | 343/6.8 R |
| 3,806,905 | 4/1974 | Strenglein | 343/6.8 R |
| 3,859,624 | 1/1975 | Kriofsky et al. | 343/6.5 R |
| 4,209,783 | 6/1980 | Ohyama et al. | 343/6.5 LC |
| 4,291,266 | 9/1981 | Portmann | 368/205 |
| 4,333,072 | 6/1982 | Beigel | 340/825.54 |
| 4,388,524 | 6/1983 | Walton | 340/825.72 |
| 4,517,563 | 5/1985 | Diamant | 340/825.54 |

*Primary Examiner*—Ulysses Weldon
*Assistant Examiner*—Ralph E. Smith
*Attorney, Agent, or Firm*—Thomas E. Schatzel

[57] ABSTRACT

An electronic identification and recognition system which has a battery powered identifier. The reader section radiates stimulus to the identifier section. A battery is switched on and power a clock and memory which in turn vary the reactance of the identifier antenna circuit. The change in reactance affects the phase angle of the voltage within the reader antenna. The phase angle changes are detected and recorded by the reader section such that the internal code of the identifier section is determined.

24 Claims, 5 Drawing Figures

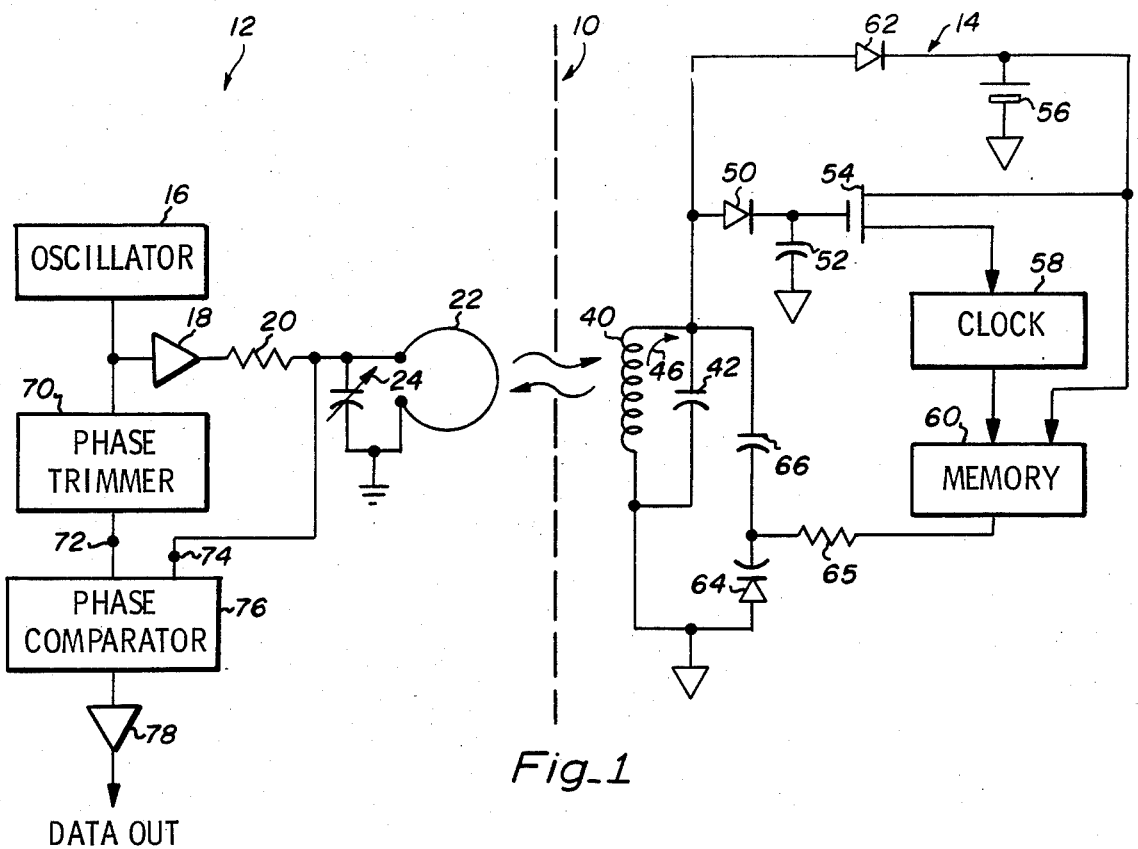
Fig_1
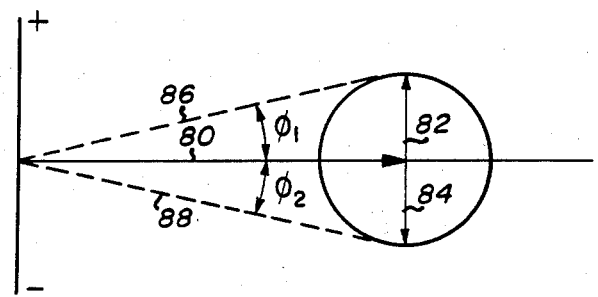
Fig_2
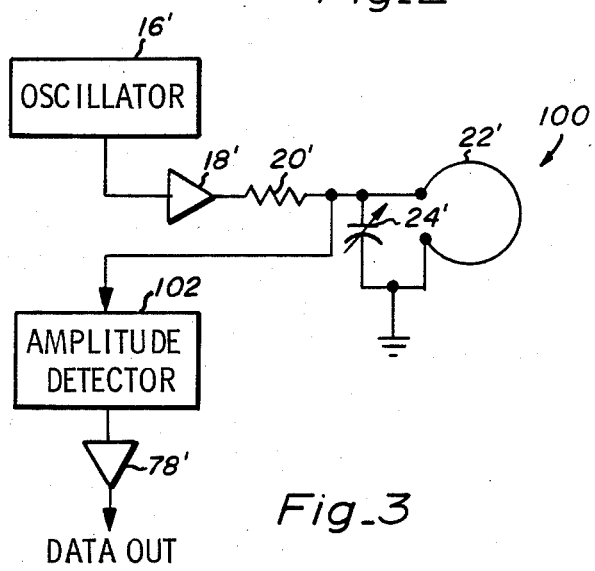
Fig_3

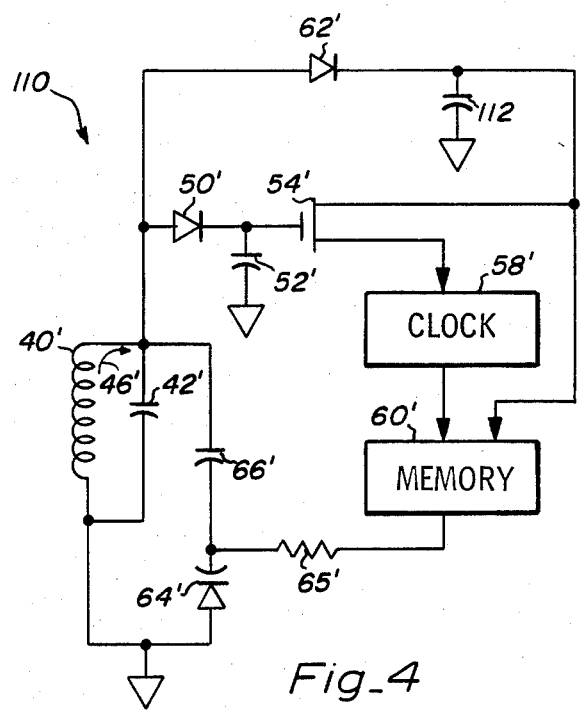
Fig_4
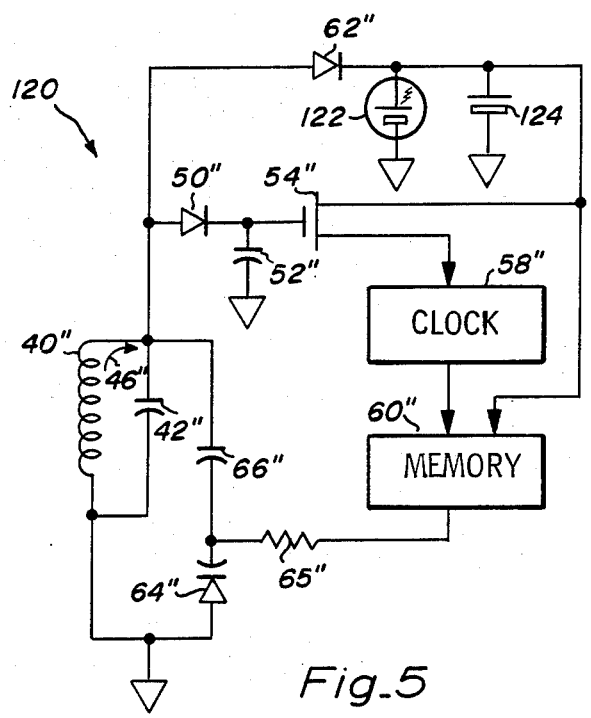
Fig_5

PROXIMITY IDENTIFICATION SYSTEM WITH POWER AIDED IDENTIFIER

BACKGROUND OF THE INVENTION

1. Field of the Invention

This invention relates generally to electronic identification and recognition systems and more specifically to such systems wherein it is not necessary to make physical contact between the identification card and the recognition apparatus, and the identifier is operable by a portable internal power source.

2. Description of the Prior Art

There are various electronic identification and recognition systems wherein the identifying device is portable. Sometimes the identifying device is referred to as a "card," "tag," "key," or the like. The recognition station or reader station is prepared to recognize identifying devices of predetermined characteristics when such identifying device is brought within the proximity of the reader station. Mutual coupling takes place between the two devices when they are proximate to one another and it is not necessary to bring the device into physical contact. The identifying device may contain a battery, though it usually receives its energy from the reader station.

Uses for such systems may include identification of persons having identifying devices in their possession. For example, the identifying device may take the shape of a credit card and have an electronic circuit embedded therein for radiating signals of identifying intelligence. An individual possessing the card may position it adjacent a door that the individual desires to enter. A recognition device may be arranged to control the door latch and if it recognizes radiating signals of certain predetermined intelligence, the door latch responds to the reader when the individual places the "card" proximate to the reader. Other uses for such systems include having the identifier in the form of a tag attached to a vehicle to be identified. As the vehicle passes a certain location, its identification is recognized and recorded. Also, in production lines, garments or other items may carry identifying tags so that they can be appropriately processed as they are recognized along various points in the production processes.

The prior art includes various patents and patent application by the present inventor. The patents include U.S. Pat. No. 4,223,830 for "Identification System", issued Sept. 23, 1980; U.S. Pat. No. 4,236,068 for "Personal Identification and Signalling System", issued Nov. 25, 1980; U.S. Pat. No. 4,384,288 for "Portable Radio Frequency Emitting Identifier", filed on Dec. 31, 1980; U.S. Pat. No. 4,459,474 for "Identification System with Separation and Direction Capability and Improved Noise Rejection", filed on May 18, 1981; U.S. Pat. No. 4,388,524 for "Electronic Identification and Recognition with Code Changeable Reactance", filed on Sept. 16, 1981; U.S. Pat. No. 4,473,825 for "Electronic Identification System with Power Input-Output Interlock and Increased Capabilities", filed on Mar. 5, 1982; U.S. Pat. Ser. No. 4,546,241 for "Identification System with Synchronous Modulation of Return Signal", filed Dec. 10, 1982; U.S. Pat. No. 4,580,041 for "Electronic Proximity Identification System with Low Power Identifier, Simplified", filed on Dec. 9, 1983; U.S. Pat. No. 4,600,829 for "Electronic Proximity Identification and Recognition System with Isolated Two-Way Coupling", filed on Apr. 2, 1984.

In the electronic portable recognition and identification systems of the prior art, the power for the identifier comes from either an internal battery, or from mutually coupled power between the reader and the identifier. Both of these methods have some problems. The prior art systems which use a battery require the battery to power both a clock and a radio frequency oscillator. The large power requirements of the radio frequency oscillator rapidly drains the battery. Thus, the battery operated identifiers of the prior art have a limited life. Some of the prior art shows identifiers which are powered by mutual coupling. However, if mutual coupling is used, the range is limited because of the difficulty of coupling sufficient power over distances.

SUMMARY OF THE PRESENT INVENTION

It is therefore an object of the present invention to provide an electronic recognition and identification system which has an increased operating range.

It is a further object of the present invention to provide an electronic recognition and identification system which has a battery powered identifier with an extended operating life.

It is also an object of the present invention to provide an electronic recognition and identification system with a battery powered identifier which can be recharged when brought in close proximity to the reader.

It is a further object of the present invention to provide an electronic recognition and identification system in which a capacitor supplies power to the identifier.

It is a further object of the present invention to provide an electronic recognition and identification system in which a solar cell supplies power to the identifier and recharges a battery in the identifier.

In an exemplary embodiment of the present invention, the system incorporates a reader section and an identifier section. The identifier section contains identification data which the reader section interrogates for and then receives. The identifier section does not physically contact the reader section.

The reader section incorporates an oscillator which drives a reader antenna. Power is radiated by and from the reader antenna to an identifier antenna in the identifier section. When the voltage induced in the identifier antenna reaches a certain level, a power supply transistor turns on power from a battery to a clock and memory. The clock and memory emit logic value signals which in turn vary the reactance of the identifier antenna circuit. This reactance change, through mutual coupling from the identifier antenna to the reader antenna, changes the vector phase angle of the voltage within the reader antenna. The reader section contains a phase comparator which compares the vector phase angle of the reader antenna voltage with a reference signal from the oscillator. The changes in the phase angle represents the code of the identifier section and it may be reported to data processing equipment at the reader section for any further data processing or action. For example, the information, after decoding, may be utilized to open or close doors, allow the lifting of a parking lot gate, notify a central authority, disperse funds, etc. A diode is connected intermediate the identifier antenna and the battery for recharging the battery when the identifier section is in close proximity to the reader section.

An advantage of the present invention is that it has an increased operating range.

Another advantage of the present invention is that it has a battery powered identifier with an extended operating life.

A further advantage of the present invention is that it has a battery powered identifier which can be recharged when brought in close proximity to the reader.

Another advantage of the present invention is that the battery can be replaced with a capacitor.

A further advantage of the present invention is that a solar cell can be used to recharge a battery in the identifier and supply power to the identifier.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a circuit diagram of an electronic recognition and identification system in accordance with the present invention;

FIG. 2 illustrates the change in the vector phase angle of the voltage in the reader antenna of FIG. 1.;

FIG. 3 is a circuit diagram of a second embodiment of the reader section of the present invention;

FIG. 4 is a circuit diagram of a second embodiment of the identifier section of the present invention; and FIG. 5 is a circuit diagram of a third embodiment of the identifier section of the present invention.

DETAILED DESCRIPTION OF THE PREFERRED EMBODIMENT

FIG. 1, illustrates a circuit diagram for a recognition and identification system of the present invention and is referred to by the general reference character 10. The system 10 incorporates a reader section 12 and an identifier section 14.

The reader section 12 contains an oscillator 16. Oscillator 16 is crystal controlled and operates at a fixed frequency, typically 13.56 MHz. The signal from the oscillator 16 is amplified by an amplifier 18 and drives through a resistor 20 to a reader antenna 22. Reader antenna 22 is tuned at or close to the oscillator 16 frequency by a tuning capacitor 24.

For operation at the typical frequency of 13.56 MHz the reader antenna 22 is a six inch square single turn loop antenna. The resonance quality "Q" is maximized and power radiation improved if the reader antenna 22 uses a large diameter heavy conductor. For larger diameters the wire inductance is reduced. This results in larger circulating currents and improved "Q" for the reader antenna 22.

Reader antenna 22 is mutually coupled to an identifier antenna 40 of the identifier section 14. The magnitude of the mutual coupling depends upon the proximity of the identifier section 14 to the reader section 12. The mutual coupling is zero when the identifier section 14 is remote and high when the identifier section 14 is close. The identifier antenna 40 is tuned by a capacitor 42. A radio frequency oscillating current 46 flows through the identifier antenna 40.

The antennas 22 and 40 shown are loop antennas and use mutual inductive coupling. An alternative antenna arrangement is to use electric dipole antennas in the shape of straight or curved conductors. These will also couple mutually.

An analysis of the vector and phase inter-relationships between the reader antenna 22 and the identifier antenna 40 is presented in a book entitled "Reference Data for Radio Engineers" published by ITT, Sixth Edition, page 9-7. When applying the above mentioned analysis to the present invention, the resonance quality "Q", the frequency, and, at a fixed distance, the coefficient of coupling are all considered to be constant.

The voltage from the reader antenna 40 is rectified by a diode 50, and smoothed by a capacitor 52. When this voltage reaches a certain level, a power supply transistor 54 is turned on and power can flow from a battery 56 to a clock 58. The power supply transistor 54 is a field effect transistor (FET). The clock 58 and a memory 60 begin to operate. Data representing the identifier section 14 is emitted from the memory 60 in a form of a string of pulses. The distinction between the logic "ones" and "zeroes" may be made in the same manner as that described in the referenced prior art patents and applications.

A diode 62 is located between the identifier antenna 40 and the battery 56. If a battery with recharge capability is used, diode 62 allows recharging of the battery 56 when the identifier section 14 is brought close to the reader section 12. This greatly extends the useful battery life and identifier life. Further, the presence of diode 62 makes it possible that, when the battery 56 has little or no charge, operation of the identifier section 14 is still possible, simply by bringing it closer to the reader section 14, where sufficient voltage is available for operation without the battery 56.

The memory 60 may be of the fusable link type, which draws no current. If this type of memory is used, there may be several sets of memory choices which can be changed by the user until all usable sets are exhausted. The memory 60 may also be of the CMOS type, and changeable an indefinite number of times, in which case a holding voltage from battery 56 is needed. The current drain on the battery for the holding voltage is extremely low.

The data signal from memory 60 controls the voltage across a varactor diode 64. The voltage charge is passed through a resistor 65. Resistor 65 is needed to avoid shunting the radio frequency present on varactor 64 into the logic circuits. The voltage change across the varactor 64 changes both its capacitance and the "Q" of the resonant circuit. Both of these changes change the phase angle and the amplitude of the current within the identifier antenna 40. The changes are mutually coupled to the reader antenna 22 and affect the vector phase angle and the amplitude of the power signal in the reader antenna 22.

A field effect transistor (FET) or an FET driving a bipolar transistor can be used in place of the varactor 64. For these transistor circuits the resistor 65 is not needed.

The oscillator 16 in the reader section 12 also sends a signal to a phase trimmer 70. Phase trimmer 70 adjusts the phase of the reference signal. Phase trimmer 70 is adjusted so that when the identifier section 14 is not present, the phase of the signal at point 72 is closely equal to the phase signal from the reader antenna 22 at point 74. Phase trimmer 70 is implemented by a resistance-capacitance lag circuit, in which an adjustable resistance produces desired amounts of time lag into the path of the oscillator sine wave. The loss of signal strength due to the resistance is recovered by amplifying the signal.

The signals from points 72 and 74 are compared by a phase comparator 76. The output of phase comparator 76 varies in levels positively and negatively according to the phase relationship of the two inputs. When the identifier section 14 is present, and current 46 is affecting the phase of the voltage across reader antenna 22, there is useful fluctuating output from the phase comparator 76. This output signal is representative of the data from the memory 60 of the identifier section 14. One choice for the phase comparator 76 is described by National Semiconductor Corporation in the "CMOS Databook" 1984, page 1-365. Also, standard CMOS or TTL logic blocks may be assembled to form a phase comparator. A phase comparator is also referred to as a balanced modulator-demodulator.

The output signal of the phase comparator 76 is passed through an amplifier 78 and raised to logic levels. The logic signal is digitally filtered, ones and zeros are separated, a computer address is formed, and then the output is used for further data processing steps, such as controlling locks, recording devices, etc.

Prior art systems with batteries in the identifier section have a radio frequency link between the reader and the identifier. In these systems the battery, in addition to powering a clock, must power a radio frequency oscillator. For a one MHz oscillator a current of over 500 microamperes is drawn. This relatively large drain severely shortens the battery's life. The present invention, by comparison, uses mutual coupling and the battery only has to advance the low frequency CMOS clock and read a low-current drain memory such as fusable link. A relatively low clock rate, such as 10 to 50 KHz, requires very little energy (less than 20 microamperes at 5 volts). The power requirements of the amplifiers are so small that a battery can last many years. Greater range than heretofore possible is achieved because there is no need to derive identifier logic power from the reader. In addition, the battery 56 is not loaded unless there is a stimulating signal from the reader section 12.

FIG. 2 shows the vectors and phase angles which represents the voltages within the reader antenna 22 of FIG. 1 as affected by the mutual coupling with the identifier section 14. A reference vector 80 represents the basic power excitation from oscillator 16. A pair of induced voltage vectors 82 and 84 represent two of the possible values of the voltage induced in the reader antenna 22. The induced voltage vectors 82 and 84 can swing through a variety of phase angles which are determined by the phase angle of current 46 flowing in the identifier antenna 40. Vectors 82 and 84 are in actuality the same vector shown in two extreme positions. The induced voltage vectors 82 and 84 will vary in magnitude according to the proximity of the reader section 12 to the identifier section 14 and according to the resonance quality "Q" of the identifier section 14 and will vary in phase according to the presence or absence of the shunting load varactor 64. The referenced phase vector 80 is added to the induced voltage vector 82 or 84 to produce a net voltage vector 86 or 88. Vectors 86 and 88 are the same vector shown in two positions. The resultant voltage as represented by the net voltage vectors 86 and 88 is present at point 74. The phase comparator 76 of FIG. 1 detects the differences of the phase angles of the net voltage vector 86 or 88 at point 74 and the referenced phase vector at point 72. The output of the phase comparator 76 is a voltage proportional to the difference in phase between vector 80 and 86 or 88.

FIG. 3 illustrates an alternative embodiment of a reader section and is referred to by the general reference character 100. Some of the components of FIG. 3 are similar to those of FIG. 1 and carry the same reference numeral distinguished by a prime designation. Reader section 100 uses amplitude detection rather than phase detection to read the code of identifier 14. An amplitude detector 102 is used in place of the phase comparator 76 of FIG. 1.

FIG. 4 illustrates an alternative embodiment of an identifier section and is referred to by the general reference character 110. Some of the components of FIG. 4 are similar to those FIG. 1 and carry the same reference numeral distinguished by a prime designation. In the identifier section 110 the battery has been replaced with a capacitor 112. The operation of identifier section 110 is similar to that of identifier section 14 of FIG. 1, but the performance is not quite as good. The capacitor 112 is charged when the identifier section 110 is brought in close proximity to the reader section 12. The capacitor 112 takes time to charge, and the time required is greater when the identifier section 110 is farther away from the reader section 12. Therefore, the overall operating time is greater, or the range is less for identifier section 110 than for identifier section 12. The value of the capacitor 112 is chosen so that it is able to provide all the current and voltage needed to power the clock 58' and the memory 60' for at least one full word of data. Identifier section 110 initiates modulation when the voltage on capacitor 112 exceeds a threshold value, stops modulation at the last data position (typically data bit at the 64th position), stops the clock at message end (typically the 96th data bit position), and awaits recovery of the voltage before again modulating. The gap from the 64th data bit position to the 96th data bit position is a dead zone or recovery zone.

FIG. 5 illustrates an alternative embodiment of an identifier section and is referred to by the general reference character 120. Some of the components of FIG. 5 are similar to those of FIG. 1, and carry the same reference numeral distinguished by a double prime designation. The operation of identifier section 120 is similar to that of identifier section 14 of FIG. 1, except that a solar cell 122 has been added. The solar cell 120 provides the small amount of power needed to power the clock 58" and the memory 60". The solar cell 122 also recharges a battery 124. If no light is available, the battery 124 can power the identifier section 120.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An electronic recognition and identification system comprising:
   a reader section including an oscillator, a reader antenna connected to said oscillator for radiating electromagnetic power responsive to said oscillator, and a detection means connected to said reader antenna and to said oscillator for detecting changes in a vector phase angle of a voltage across said reader antenna relative to the oscillator signal and for delivering output signals responsive to said changes in vector phase angle; and an identifier section having an identifier antenna for receiving power from said reader antenna by mutual coupling, a reactance modulation circuit connected to said identifier antenna, a data register means for providing an advance and sequence of data joined to said reactance modulation circuit, such that a vector phase angle of a current of said modulation circuit varies responsive to said sequence of data, a battery for powering said data register means, a diode connected intermediate said identifier antenna and said battery such that the battery is recharged when the identifier section is in close proximity to the reader section, and means for switching on power from said battery when the identifier section is in close proximity to the reader section and for switching off power from said battery when the identifier section is distant from the reader section.

2. The system of claim 1 wherein,
the reader section further includes an amplifier intermediate said oscillator and said reader antenna for amplifying the signal from said oscillator, and an impedance intermediate said amplifier and said reader antenna.

3. The system of claim 1 wherein,
the reader section further includes an amplifier connected to the output of said detection means for amplifying the signal from said detection means.

4. The system of claim 1 wherein,
the data register comprises a clock and a memory circuit.

5. The system of claim 1 wherein,
the identifier section further includes a fixed capacitor connected parallel with said identifier antenna to tune said indentifier antenna to predetermined frequencies.

6. The system of claim 1 wherein,
said reactance modulation circuit is comprised of a varactor means and an impedance connected across said identifier antenna for varying the phase angle of the current passing through said identifier antenna in accordance with the sequence of data from said data register means.

7. The system of claim 6 wherein,
a resistor is connected intermediate said varactor means and said data register means.

8. The system of claim 1 wherein,
said means for switching on and off power from said battery is comprised of a power supply transistor connected to said identifier antenna such that a control voltage of said power supply transistor controls the flow of power from said battery to said data register means.

9. The system of claim 8 wherein,
the identifier section further includes rectifying means and filtering means intermediate said identifier antenna and said power supply transistor.

10. The system of claim 1 wherein,
the reader section further includes a tuning capacitor connected parallel with said reader antenna to tune said reader antenna to predetermined frequencies.

11. The system of claim 1 wherein,
said reader and identifier antennas are loop antennas, such that power is radiated by mutual coupling from said reader antenna to said identifier antenna, and said identifier antenna radiates changes in vector phase angle to the reader antenna by mutual coupling.

12. The system of claim 1 wherein,
the identifier section further includes a solar cell connected parallel to said battery.

13. An electronic recognition and identification system comprising:
a reader section including an oscilltor, a reader antenna connected to said oscillator for radiating electromagnetic power responsive to said oscillator, and a detection means connected to said reader antenna and to said oscillator for detecting changes in an amplitude of a voltage across said reader antenna relative to the oscillator signal and for delivering output signals responsive to said changes in amplitude; and an identifier section having an identifier antenna for receiving power from said reader antenna by mutual coupling, a reactance modulation circuit connected to said identifier antenna, a data register means for providing an advance and sequence of data joined to said reactance modulation circuit, such that an amplitude of a voltage of said modulation circuit varies responsive to said sequence of data, a battery for powering said data register means, a diode connected intermediate said identifier antenna and said battery such that the battery is recharged when the identifier section is in close proximity to the reader section, and a means for switching on power from said battery when the identifier section is in close proximity to the reader section and for switching off power from sasid battery when the identifier section is distant from the reader section.

14. The system of claim 13 wherein,
the reader section further includes an amplifier intermediate said oscillator and said reader antenna for amplifying the signal from said oscillator, and an impedance intermediate said amplifier and said reader antenna.

15. The system of claim 13 wherein,
the reader section further includes an amplifier connected to the output of said detection means for amplifying the signal from said detection means.

16. The system of claim 13 wherein,
the data register means comprises a clock and a memory circuit.

17. The system of claim 13 wherein,
the identifier section further includes a fixed capacitor connected parallel with said identifier antenna to tune said identifier antenna to predetermined frequencies.

18. The system of claim 13 wherein,
said reactance modulation circuit is comprised of a varactor means and an impedance connected across said identifier antenna for varying the amplitude of the voltage in said identifier antenna in accordance with the sequence of data from said data register means.

19. The system of claim 18 wherein,
a resistor is connected intermediate said varactor means and said data register means.

20. The system of claim 14 wherein,
said means for switching on and off power from said battery is comprised of a power supply transistor connected to said identifier antenna such that a control voltage of said power supply transistor controls the flow of power from said battery to said data register means.

21. The system of claim 20 wherein,
the identifier section further includes rectifying means and filtering means intermediate said identifier antenna and said power supply transistor.

22. The system of claim 13 wherein,
the reader section further includes a tuning capacitor connected parallel with said reader antenna to tune said reader antenna to predetermined frequencies.

23. The system of claim 13 wherein,
said reader and identifier antennas are loop antennas, such that power is radiated by mutual coupling from said reader atenna to said identifier antenna, and said identifier antenna radiates changes in voltage amplitude to the reader antenna by mutual coupling.

24. The system of claim 13 wherein,
the identifier section further includes a solar cell connected parallel to said battery.

* * * * *